(12) United States Patent
Davis et al.

(10) Patent No.: US 9,306,206 B2
(45) Date of Patent: Apr. 5, 2016

(54) ALKALINE CELL HAVING INCREASED INTERFACIAL AREA

(71) Applicant: The Gillette Company, Boston, MA (US)

(72) Inventors: Stuart Michael Davis, Norfolk, MA (US); Javit Ahmed Drake, Jamaica Plain, MA (US); Christopher P. Haines, Westford, MA (US)

(73) Assignee: The Gillette Company, Boston, MA (US)

( * ) Notice: Subject to any disclaimer, the term of this patent is extended or adjusted under 35 U.S.C. 154(b) by 268 days.

(21) Appl. No.: 13/965,447

(22) Filed: Aug. 13, 2013

(65) Prior Publication Data
US 2014/0057160 A1 Feb. 27, 2014

Related U.S. Application Data (60) Provisional application No. 61/693,505, filed on Aug. 27, 2012.

(51) Int. Cl.
*H01M 6/08* (2006.01)
*H01M 6/10* (2006.01)
*H01M 4/00* (2006.01)
(Continued)

(52) U.S. Cl.
CPC ............... *H01M 4/00* (2013.01); *H01M 2/022* (2013.01); *H01M 2/0272* (2013.01); *H01M 2/0287* (2013.01); *H01M 2/26* (2013.01); *H01M 6/08* (2013.01); *H01M 4/244* (2013.01); *H01M 4/50* (2013.01); *H01M 4/625* (2013.01);
(Continued)

(58) Field of Classification Search
USPC ................................. 429/164, 165, 128, 208
IPC ................................................ H01M 6/08,6/10
See application file for complete search history.

(56) References Cited

U.S. PATENT DOCUMENTS 3,335,031 A 8/1967 Kordesch
3,945,847 A 3/1976 Kordesch et al.
(Continued)

FOREIGN PATENT DOCUMENTS

FR 2622359 4/1989

OTHER PUBLICATIONS

PCT International Search Report with Written Opinion in corresponding Int'l appln. PCT/US2013/056800 dated Nov. 29, 2013.

*Primary Examiner* — Patrick Ryan
*Assistant Examiner* — Julian Anthony
(74) *Attorney, Agent, or Firm* — Leo J. White; Kevin C. Johnson; Steven W. Miller (57) ABSTRACT

An alkaline cell comprising a housing having a bottom end and a top end, and an electrode assembly disposed within the housing. The electrode assembly comprises a single first electrode and a single second electrode, a separator therebetween, and an electrolyte. The first electrode comprises a hollow outer body and at least one inner body positioned inside the outer body, the outer body and the at least one inner body being joined together inside the housing to form a single substantially homogeneous structure having an essentially uniform electrode properties. The second electrode comprises an intermediate body at least partially disposed between the outer body and the at least one inner body and electrically isolated from the outer body and the at least one inner body.

17 Claims, 7 Drawing Sheets

(51) Int. Cl.
  *H01M 2/02* (2006.01)
  *H01M 2/26* (2006.01)
  *H01M 4/24* (2006.01)
  *H01M 4/50* (2010.01)
  *H01M 4/62* (2006.01)
  *H01M 4/66* (2006.01)

(52) U.S. Cl.
  CPC ...... *H01M 4/661* (2013.01); *H01M 2002/0205* (2013.01); *H01M 2300/0014* (2013.01)

(56) References Cited

U.S. PATENT DOCUMENTS

| | | | |
|---|---|---|---|
| 4,032,695 | A | 6/1977 | Coibion |
| 5,300,371 | A | 4/1994 | Tomantschger et al. |
| 5,472,806 | A | 12/1995 | Meintjes |
| 5,518,836 | A * | 5/1996 | McCullough ............ 429/94 |
| 5,869,205 | A | 2/1999 | Mick et al. |
| 6,074,781 | A | 6/2000 | Jurca |
| 6,224,640 | B1 | 5/2001 | Tucholski |
| 6,261,717 | B1 | 7/2001 | Luo et al. |
| 6,326,102 | B1 | 12/2001 | Getz |
| 6,342,317 | B1 | 1/2002 | Patel et al. |
| 6,410,187 | B1 | 6/2002 | Luo et al. |
| 6,472,099 | B1 | 10/2002 | Lee et al. |
| 6,482,543 | B1 | 11/2002 | Shelekhin et al. |
| 6,737,189 | B1 | 5/2004 | Vandayburg et al. |
| 6,805,995 | B2 | 10/2004 | Yoshinaka et al. |
| 6,869,727 | B2 | 3/2005 | Slezak |
| 7,264,903 | B2 | 9/2007 | Coffey et al. |
| 7,341,803 | B2 * | 3/2008 | Huang et al. ............ 429/209 |
| 7,553,585 | B2 | 6/2009 | Slezak |
| 2001/0028976 | A1 | 10/2001 | Treger et al. |

\* cited by examiner

ALKALINE CELL HAVING INCREASED INTERFACIAL AREA

FIELD OF THE INVENTION

The invention relates to alkaline batteries having a single anode and a single cathode that form an increased anode-cathode interfacial area.

BACKGROUND OF THE INVENTION

Conventional cylindrical alkaline zinc-manganese dioxide cells (also known as "alkaline cells"), such as, for example, AA batteries, AAA batteries, and D batteries, employ a conventional bobbin construction containing a single anode and a single cathode. The rate capability of such conventional alkaline cells is typically limited due to a limited interfacial area existing between the anode and the cathode and excessively thick electrodes (both anode and cathode). An increase in the anode-cathode interfacial area would raise the cell's rate capability.

Battery constructions that employ multiple electrodes in order to achieve a higher interfacial area between the anode(s) and the cathode(s) are known; such designs can also use thinner electrodes. For example, one known design employs more than one anode in combination with a single cathode or more than one cathode in combination with a single anode. Conceivably, more than one electrode of both types could also be employed, in combination.

But such known designs utilizing multiple electrodes are complicated by the need to electrically interconnect several separate anode and/or cathode structures, essentially creating parallel electrical connections between the various portions of the same electrode type/polarity, i.e., anode-anode connections and cathode-cathode connections, so that these can discharge and deliver energy simultaneously.

For example, U.S. Pat. No. 5,869,205 is directed to an electrochemical cell having a first electrode, such as a cathode, and a plurality of second electrodes, such as anodes. A plurality of cavities is formed within the cathode, and a current collector electrically connects the anodes together. U.S. Pat. No. 7,341,803 is directed to an alkaline cell with improved high-rate and high-power discharge capacity, wherein the cell has an additional anode or cathode.

WO 2004/095606 A2 is directed to a cell having at least one pre-formed pellet disposed inside the cell's housing and including an outer electrode portion formed from a material to geometrically define the pellet in a solid form. The pellet includes an inner electrode encapsulated by a separator and imbedded within the material of the outer electrode portion. WO 2005/022671 A1 is directed to a cell, such as a cylindrical alkaline cell, comprising an inner electrode encapsulated by a separator and having a thin cross-section in a folded configuration, the inner electrode being formed such that its outer extent is generally conforming to a contour defined by the interior surface of the housing.

It appears that in some of the above attempts the electrode interfacial area can be increased and the effective thicknesses of both the anode and cathode electrodes can be reduced relative to those in an ordinary cylindrical alkaline cell. These approaches, however, will likely require complex and expensive manufacturing processes. The complexity and cost are born by the need to interconnect electrically the multiple anodes and multiple cathodes, the need to create non-symmetric, non-concentric shapes, and the need to isolate interconnecting means inside the cell.

There is a need, therefore, for a cell having an increased electrode interfacial area and thus providing superior high-rate performance—but not requiring the interconnection of multiple anodes and cathodes inside the cell.

SUMMARY OF THE INVENTION

The present invention provides a cell design with superior high-rate performance based on increased electrode interfacial area and thus reduced effective electrode thicknesses, yet having a design that does not require the interconnection of multiple anodes and cathodes. The invention is directed to an alkaline cell comprising a housing having a bottom end and a top end, and an electrode assembly disposed within the housing. The electrode assembly comprises a single first electrode and a single second electrode, a separator disposed between the first electrode and the second electrode, and an electrolyte. The first electrode comprises a hollow outer body and at least one inner body positioned inside the outer body. The outer body and the at least one inner body are structurally joined together inside the housing to form therein a single substantially homogeneous structure having an essentially uniform electrode properties, such as, e.g., electric conductivity. The second electrode comprises an intermediate body at least partially disposed between the outer body and the at least one inner body. The intermediate body is electrically isolated from the outer body and the at least one inner body.

BRIEF DESCRIPTION OF THE DRAWINGS

While the specification concludes with claims particularly pointing out and distinctly claiming the subject matter which is regarded as forming the present invention, it is believed that the invention will be better understood from the following description taken in conjunction with the accompanying drawings.

DETAILED DESCRIPTION OF THE INVENTION

The cell 10 of the present invention comprises a housing 20. The housing 20 can be formed, at least partially, by a can for example. The cell has two mutually opposite ends: a first or bottom end 11 and a second or top end 12. One skilled in the art will readily understand that the terms such as "top" and "bottom," "above" and below," and the like, are relative terms of convention, describing the cell as it is shown in the several drawings herein. In use, the cell 10 can be oriented otherwise.

The housing 20 can be of any conventional type commonly used in primary alkaline batteries and can be made of any suitable material, such as, e.g., nickel-plated cold-rolled steel or plastic. A seal 70, which is shown in the drawings to be adjacent to the top end 12, can be made, e.g., of a polyamide (Nylon). The housing 20 may have a conventional cylindrical shape—or may have any other suitable non-cylindrical, e.g., prismatic, shape. Interior walls of the housing 20 may be treated with a material that has low electrical-contact resistance to an electrode, such, e.g., as carbon. The interior walls of the housing 20 may be plated, e.g., with nickel, cobalt, or painted with a carbon-loaded paint.

An electrode assembly disposed inside the housing 20 comprises a single first electrode 30 and a single second electrode 40. The term "single" in the present context indicates that the electrode, whether solid, semi-solid, or liquid, comprises a single substantially homogeneous structure—as opposed to two or several separate electrodes interconnected by a wire or wires and the like. This single substantially homogeneous structure can be either formed as a whole of a single body or assembled from two or more individual components. In the latter instance, the individual components are assembled to form a single substantially homogeneous electrode having essentially uniform electrode properties, such as, e.g., electric conductivity/resistance throughout its body.

One of the first and second electrodes 30, 40 has a positive charge while the other has a negative charge. The electrodes 30, 40 are electrically isolated from one another by a separator 50 disposed between the electrodes 30, 40. Any suitable separator, such as, e.g., a conventional alkaline-battery-type separator, can be used in the cell 10. The separator 50 can include, e.g., a layer of cellophane combined with at least one layer of non-woven material. For an AA-type battery, e.g., the separator 50 may have a wet thickness of less than 0.30 mm, specifically less than 0.20 mm and more specifically less than 0.10 mm; and a dry thickness of less than 0.10 mm, specifically less than 0.07 mm and more specifically less than 0.06 mm. Any conventional method of installing the separator 50 can be used.

The first electrode 30 comprises a substantially hollow outer body 31 and at least one inner body 32 positioned inside the outer body 31. The outer body 31 and the at least one inner body 32 are joined together inside the housing 20 to form a single substantially homogeneous structure having an essentially uniform electrode properties, such, e.g., as electric conductivity throughout. Thus, wires or similar means are neither needed nor employed to interconnect parts of the first electrode 30.

One skilled in the art will readily understand that the terms "hollow," "empty," "homogeneous," "solid," and the like, when applied to the electrodes of the invention, are used herein to describe the relative structural differences between the described elements as such—and without regard to the electrolyte inside the cell, current collectors inserted into one or more electrodes, or one electrode being disposed inside the other electrode. In other words, these terms describe the structure of an element in isolation from other elements that may be associated with (by virtue of being inside, for example) the described element. Thus, an otherwise uniform electrode that has a current collector inserted therein may be described herein as "homogeneous." Likewise, a cup-shaped electrode that has inside electrolyte and/or a portion of another electrode may be described herein as "hollow." By the same token, a void or cavity inside an electrode may be described herein as an "empty space"—even if such void is occupied, in the assembled cell 10, by a portion of another electrode.

In the several embodiments, the first electrode 30 comprises a cup-shaped, essentially cylindrical, or tubular, body 31, including vertical, substantially cylindrical walls 31a (FIG. 1), and at least a first (bottom) disk 33, having a thickness "D." The disk 33 is disposed substantially perpendicular to the walls 31a and interconnects the latter. The terms "vertical," "horizontal," "top," and "bottom," and the like are descriptive terms of convention used herein in reference to several elements of the cell 10 as shown in the drawings herein. The vertical walls can be substantially parallel to a longitudinal axis 99 of the cell 10 and to the walls of the cell's housing 20.

Figure 1:
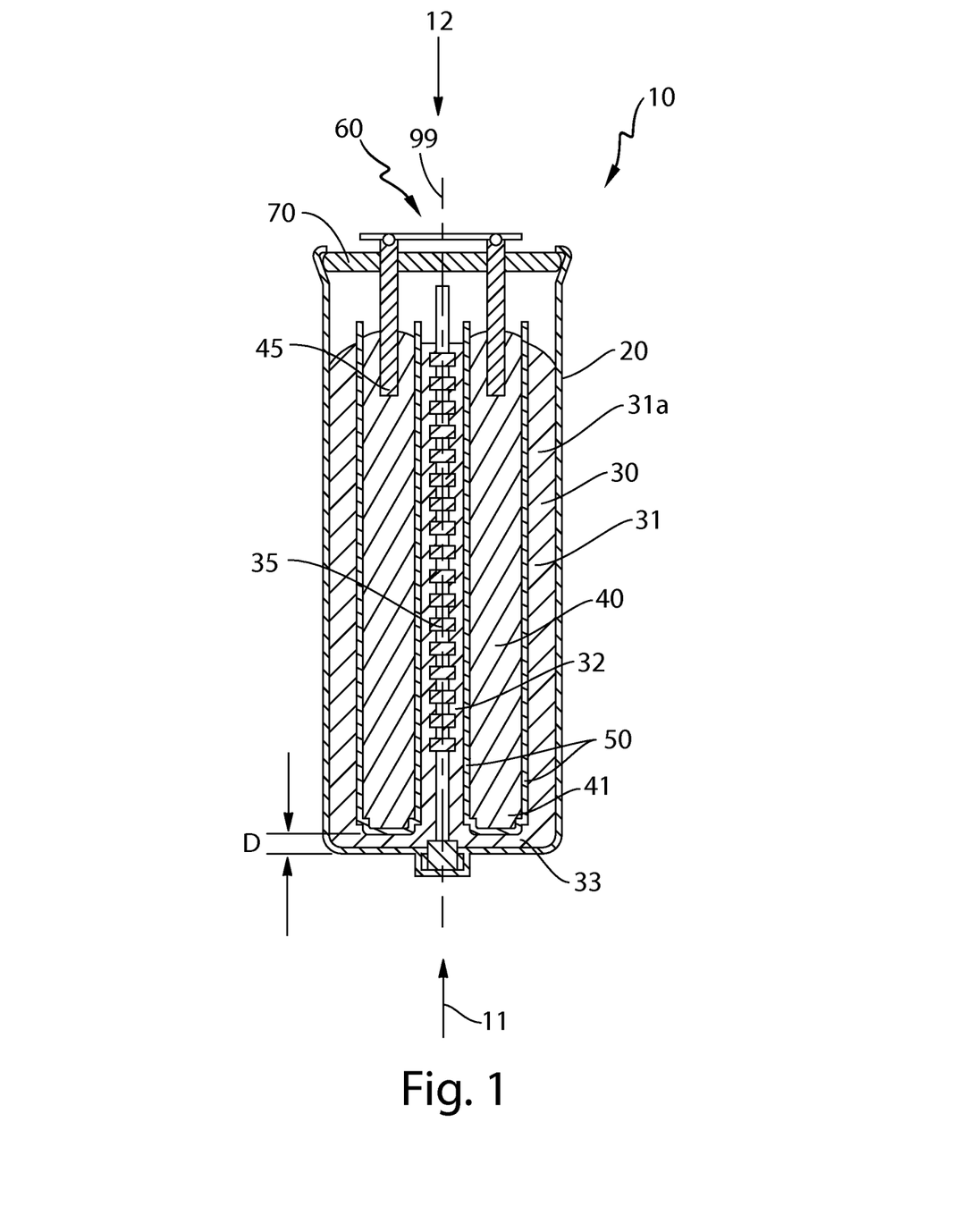
FIG. 1 is a schematic cross-sectional view of an embodiment of the cell of the present invention, comprising a first and second electrodes, showing a configuration of the cell in which the first electrode contacts the cell's housing, which acts as a first-electrode current collector.
Figure 2:
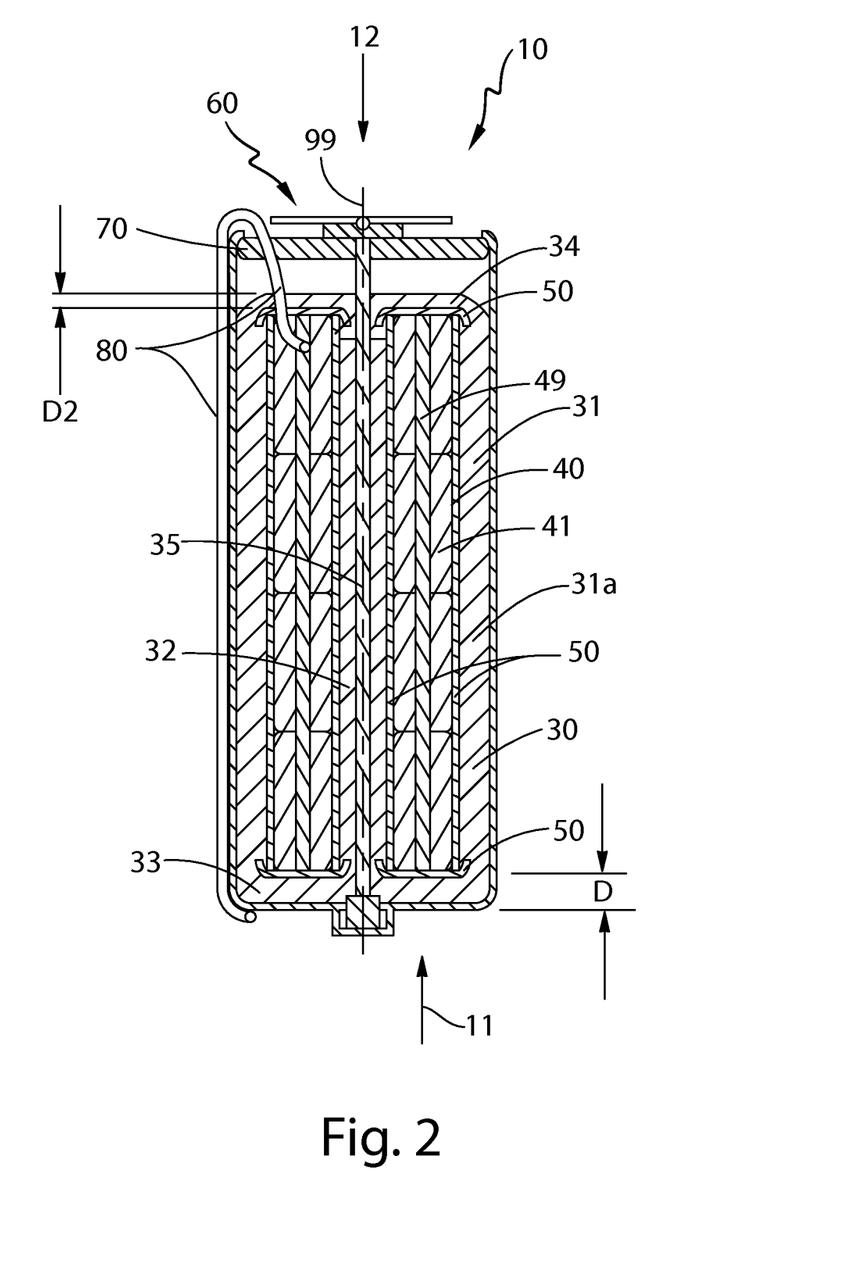
FIG. 2 is a schematic cross-sectional view of another embodiment of the cell of the present invention, in which the relative positions of first and second electrodes are reversed relative to those of the embodiment of FIG. 1.
Figure 3:
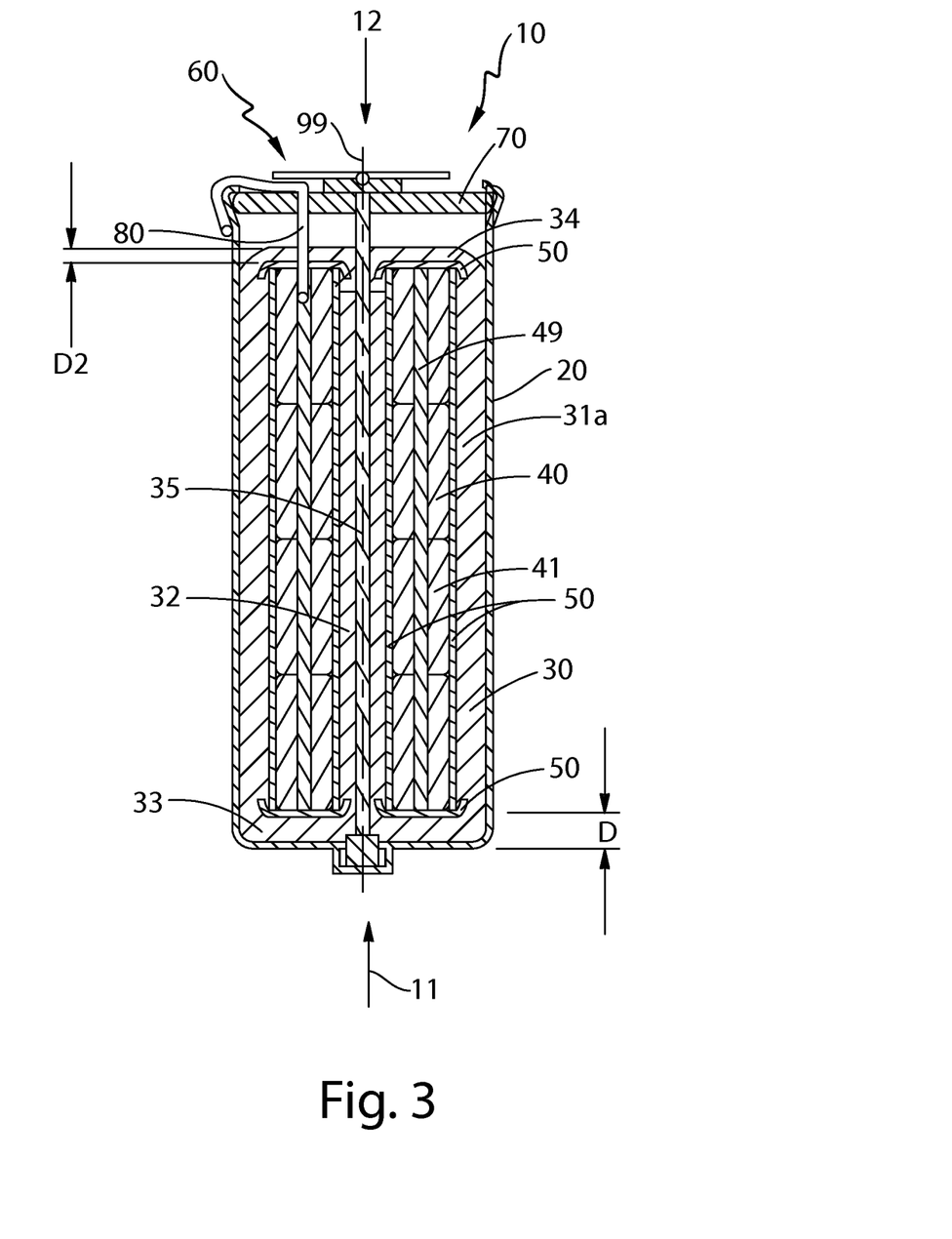
FIG. 3 is a schematic cross-sectional view of a variation of the embodiment shown in FIG. 2.

In the embodiments of FIGS. 1-3, the inner body 32 of the first electrode 30 is formed by an essentially homogeneous cylinder positioned inside and coaxially with the outer hollow body 31. The inner body 32 contacts and depends from the first disk 33, which interconnects the inner body 32 and the walls 31a to form a single substantially homogeneous structure of the first electrode 30 having an essentially uniform electrode properties, such, e.g., as electric conductivity. In other words, the outer hollow body 31 and the inner body 32 are joined together by at least the first end disk 33 disposed adjacent to the bottom end 11 of the cell 10 to form a single first-electrode structure.

The second electrode 40 comprises an intermediate body 41 at least partially disposed between the outer body 31 and the at least one inner body 32 of the first electrode 30. The intermediate body 41 of the second electrode 40 is electrically isolated from the outer body 31 and the at least one inner body 32 of the first electrode 30.

In the exemplary embodiments of FIGS. 1-3, the end disk 33, together with the separator 50, separates the second electrode 40 from the inner surface of the cell's bottom end 11. In these embodiments, each of the housing 20, the outer body 31, the at least one inner body 32, and the intermediate body 41 has a shape comprising cylindrical walls; and the housing 20, the outer body 31, the at least one inner body 32, and the intermediate body 41 are coaxial, i.e., they all have a common longitudinal axis 99, or axially aligned.

A conventional current collector 35 can be inserted into the inner body 32 of the first electrode 30. The current collector 35 may be serrated (FIG. 1) to increase its surface contact with the material of the first electrode 30. The current collector 35 may be electrically connected to the bottom end 11 of the cell 10, as is shown in FIG. 1, e.g., by spot welding, or by any other suitable technique known in the art. The current collector 35 may be made of metal, e.g., steel—or any other suitable material. It may be optionally plated with nickel, cobalt, or another suitable material presenting a low electrical-contact resistance between the collector 35 and the first electrode 30, and may—additionally or alternatively—be coated with a carbon-loaded paint.

As a skilled artisan will readily recognize, one of the first and second electrodes 30, 40 is a positive electrode (cathode) while the other is a negative electrode (anode). For example, in the embodiment of FIG. 1, showing a so-called "conventional" configuration of the cell, the first electrode 30 is a positive electrode that contacts the inner surface of the housing 20, while the second electrode 40 is a negative electrode, electrically isolated from the housing 20. In this embodiment, the housing 20 acts as a positive current collector. The second electrode 40 may have one or more current collectors 45 inserted therein. These current collectors 45 can extend to the top end 12 to be electrically connected to the top-end cap, including a seal assembly 60, which is isolated, e.g., by a seal 70, from the housing 20.

As an example, the cell shown in FIG. 1 may be assembled in the following manner. The first-electrode current collector 35 is placed inside a suitable cylindrical die (not shown). The die is filled with a first-electrode material, surrounding the first-electrode current collector 35. The first-electrode material is compacted around the current collector 35 so that it adheres thereto. This can be repeated several times to build up a cylinder of the first-electrode material, with the embedded first-electrode current collector 35 inside. The resulting first-electrode sub-assembly, comprising the cylinder of the compacted first-electrode material, i.e., the inner body 32 of the first electrode 30, with the imbedded first-electrode current collector 35 inside, can then be removed from the die and set aside.

A hollow outer body 31 of the first electrode 30 can be formed inside the housing 20, adjacent to the housing's walls. For example, a series of rings comprising the first-electrode material may be inserted into the housing 20 and pressed therein. These rings can be further compacted in the housing 20 to form the hollow outer body 31 and to improve electrical contact between the rings/the body 31 and the housing 20. The rings may be pressed slightly oversize and may be interference-fitted into the housing 20 by using of a tapered insertion die, as a skilled artisan will recognize.

The inner body 32 of the first electrode 30, with the imbedded first-electrode current collector 35 inside, can then be placed in the housing 20, having the hollow outer body 31 inside so that an annular open space is formed between the inner body 32 and the outer body 31. The inner body 32 with the imbedded first-electrode current collector 35 can be positioned coaxially with the housing 20, and spot-welded to the bottom end 11 of the cell 10 to fix the inner body 32 inside the housing 20 and to create an electrical contact between the first-electrode current collector 35 and the housing 20.

An additional portion of the first-electrode material may be poured through the annular open space formed between the hollow outer body 31 and the inner body 32—and firmly pressed from above to form the first end disk 33, bridging the hollow outer body 31 and the inner body 31, thereby forming a single homogeneous body of the first electrode 30. The remaining annular open space in the first electrode 30, formed between the hollow outer body 31 and the inner body 32 is structured and configured to receive the intermediate body of the second electrode 40.

Alternatively or additionally, the first electrode 30 may be formed using extrusion, which may be performed in a single step—or may comprise a multi-step process. For example, the central current collector 35 may be positioned along and coaxially with the cell's longitudinal axis 99 and welded in place before placing any first-electrode material into the housing 20. A fixed weight or volume of the first-electrode material, such, e.g., as granulate, can then be metered into the housing 20. The housing 20 can be supported in a female die while an extrusion punch is pushed down into the blend, forming the first electrode 30 in one operation. Suitable tapers on the first-electrode punch may allow it to be retracted without damaging the first electrode 30.

The annular open space formed between the hollow outer body 31 and the inner body 32 of the first electrode 30 may then be lined with any suitable separator 50, e.g., in the form of a liquid-applied separator or a conventional non-woven or cellophane separator. Next, the open space formed between the hollow outer body 31 and the inner body 32 may be filled with a second-electrode material to form the second electrode 40. Alternatively, a compacted body of particulate material, such as, e.g., zinc, may be pre-formed and placed into the separator-lined open space formed between the outer body 31 and the inner body 32. In one embodiment, e.g., a compacted cylinder of particulate second-electrode material may be wrapped or coated with the separator 50 and then inserted into the open space formed between the hollow outer body 31 and the inner body 32 of the first electrode 30.

The electrolyte may then be dispensed, e.g., pipetted, into the cell 10 to wet out all of the components therein. Any suitable electrolyte may be used in the cell 10. For example, the electrolyte may comprise an aqueous solution of alkali hydroxide, such as potassium hydroxide or sodium hydroxide. The electrolyte can also be an aqueous solution of saline electrolyte, such as zinc chloride, ammonium chloride, magnesium perchlorate, magnesium bromide, or their combinations.

The cap assembly 60, including the seal 70, may then be installed. This may include installing one or more second-electrode current collector(s) 45 (FIG. 1). These current collectors 45 can be made, e.g., from a suitable low-gassing metal such as, e.g., phosphor bronze, tin plated brass, et cetera, as one skilled in the art would recognize. The current collector(s) 45 are partially immersed in, or otherwise make contact with, the second electrode 40.

The assembled cell 10, containing a single first electrode (e.g., cathode) and a single second electrode (e.g., anode), exhibits an increased interfacial area therebetween. In addition, the cell 10 can be said to have effectively thinner electrodes than a conventionally built alkaline cell. The term "effectively thinner" in the present context means that although the total physical thickness of the electrodes may be the same as, or similar to, that of a conventional cell, these electrodes' ability to discharge from both sides at once effectively minimizes their "electrochemical" thickness, relative to conventional electrodes. In addition, the second electrode 40 is able to discharge from a third side, juxtaposed with the at least first end disk 33 disposed at the bottom end of the cell 10.

As is explained herein, either the first electrode 30 or the second electrode 40 can be a cathode, and either the second electrode 40 or the first electrode 30 can be an anode. If in FIG. 1, e.g., the first electrode 30 may constitute a cathode and the second electrode 40 may constitute an anode, then in FIGS. 2 and 3, e.g., the relative positions of the cathode and the anode can be said to be reversed relative to those shown in FIG. 1. In the embodiments of FIGS. 2 and 3 the first electrode 30 may constitute an anode, comprising the outer hollow body 31 and the inner body 32; and the second electrode 40 may constitute a cathode, comprising the intermediate hollow body 41, disposed between the outer hollow body 31 and the inner body 32 of the anode.

In the embodiments in which the first electrode constitutes an anode, the housing 20, made, e.g., of steel, may be lined with plastic to avoid direct contact of the zinc anode with steel, which may result in severe hydrogen gassing. The plastic may comprise a free-standing molded insert. Alternatively, the walls of the housing 20 may be coated with plastic. The first-electrode current collector 35 (which in FIGS. 2 and 3 is a negative current collector) may comprise a conventional bronze or brass nail, inserted into the anode slurry. The cathode may comprise a conventional cathode blend pressed onto a metal grid 49, such as, e.g., steel or nickel-plated steel with optional carbon coating, and formed into a hollow cylinder. An insulated wire 80 may be attached to the cathode metal grid 49 allow an eventual connection to the steel housing 20.

In the exemplary embodiments of FIGS. 2 and 3, the housing 20 may be filled with anode zinc slurry. The second electrode 40, comprising an intermediate body 41, may be enclosed in the separator 50 (liquid-applied or conventional non-woven or cellophane) and is inserted into the anode slurry so as to be totally immersed, leaving a bridge of slurry disposed over the top of the cathode, adjacent to the top end 12 of the cell 10, and connecting the inner body 32 of the first electrode 30 (comprising in FIG. 2 the anode central cylinder) with the outer hollow body 31. The cathode cylinder is not pushed all the way to the bottom of the housing 20, but is allowed to float at the distance D from the inner surface of the housing's bottom, so that another bridge of anode slurry remains below the cathode, adjacent to the bottom end of the cell 10, and also connecting the inner body 32 with the outer hollow body 31. In the assembled cell 10, the bridge of the anode slurry disposed over the top of the cathode forms the first end disk 33; and the bridge of the anode slurry disposed below the cathode forms the second end disk 34, having a thickness D2.

An insulated wire 80, attached to the cathode grid 49, may be threaded through the seal assembly 60, which may then be placed and crimped over the cell 10. The first-electrode current collector 35 (which may comprise a conventional bronze or brass material) can be inserted into the central portion of the anode, connecting it to the cell's negative terminal. The insulated wire 80 connected to the current collector grid 49 can be also connected (e.g., spot welded) to the positively charged housing 20. An integrally formed connection in the steel housing 20 forms the positive terminal.

In the embodiment of FIG. 3, the housing 20 can be made of plastic. To avoid moisture permeation in either direction, the plastic may be metallized on the exterior surface. The insulated positively charged lead in this embodiment connects directly to the positive terminal, which may comprise a separate assembly from the housing 20. The connecting wire 80 can take the form of a thin flat metal ribbon, positioned under the cell's label. The plastic housing has an advantage of a lower manufacturing cost compared to that of a steel housing. However, since plastic is not nearly as stiff or strong as steel, a thicker plastic housing wall may be required, thereby diminishing the available internal volume of the cell.

Figure 4:
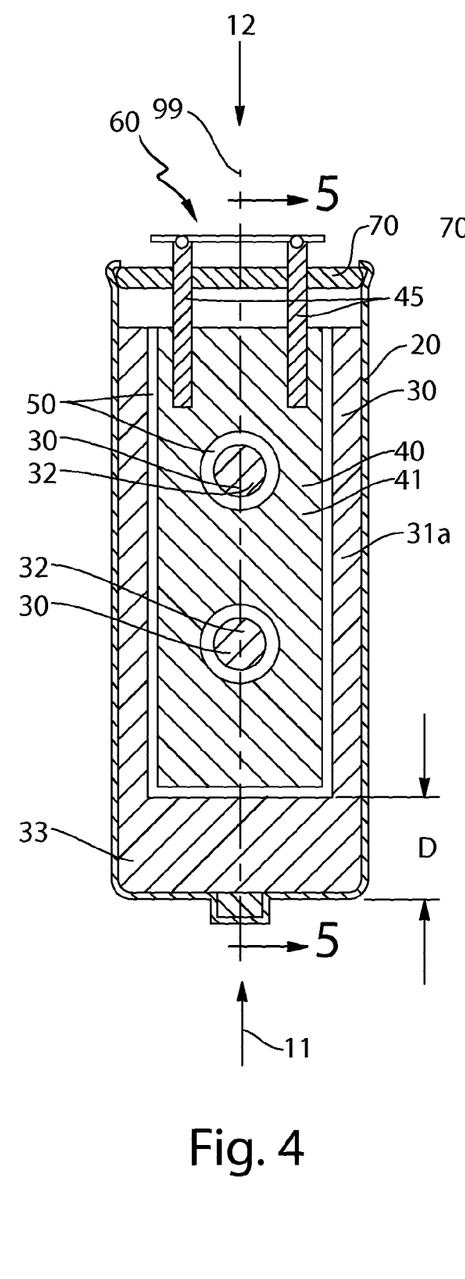
FIG. 4 is a schematic cross-sectional view of an embodiment of the cell of the present invention, in which the first electrode contacts the cell's housing formed by the can, and the second electrode has two empty spaces therein, each occupied by a portion (an inner body) of the first electrode.
Figure 5:
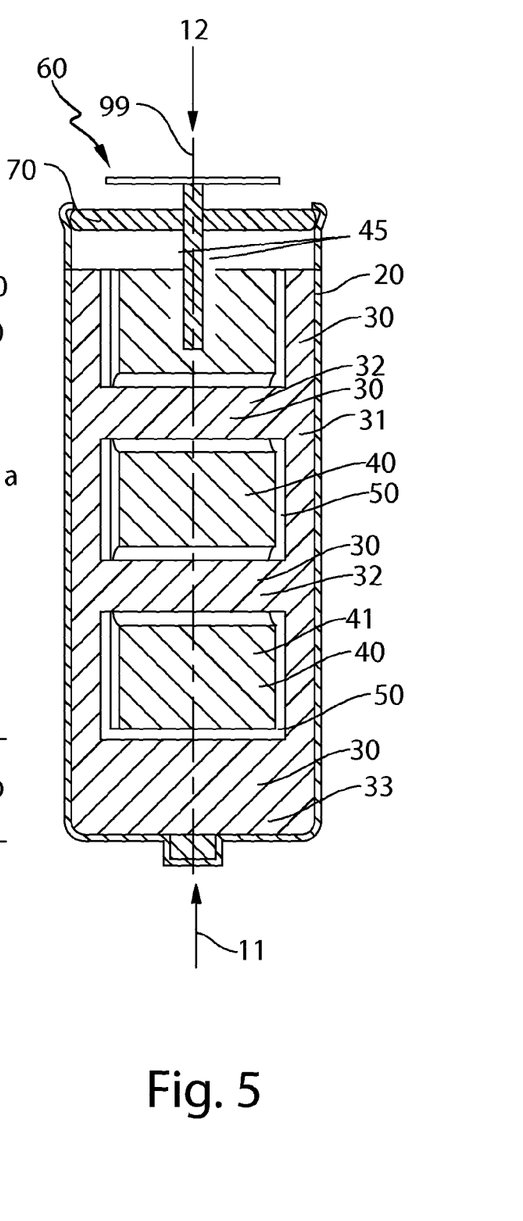
FIG. 5 is a schematic cross-sectional view of the embodiment shown in FIG. 4, taken along lines 5-5.
Figure 6:
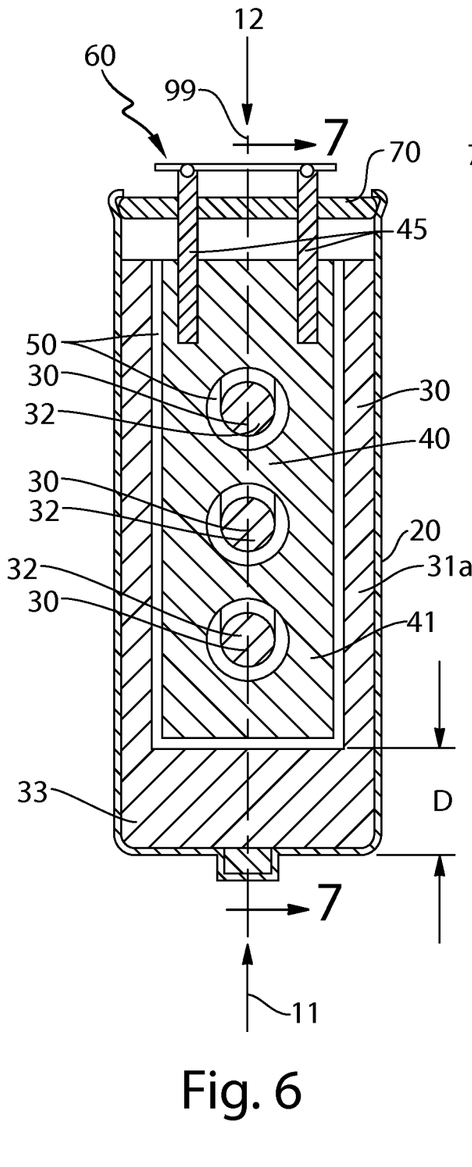
FIG. 6 is a schematic cross-sectional view of a variation of the design shown in FIGS. 4 and 5, in which three inner bodies of the first electrode are disposed inside empty spaces of the second electrode at an acute angle relative to a longitudinal axis of the outer body.
Figure 7:
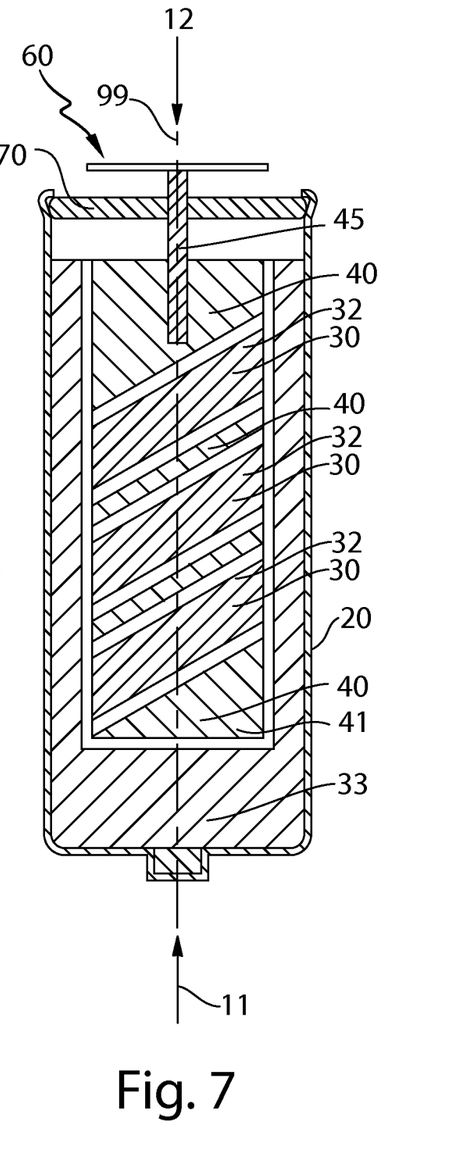
FIG. 7 is a schematic cross-sectional view of the embodiment shown in FIG. 6, taken along lines 7-7.

In the embodiment of FIGS. 4-5 and 6-7, the first electrode 30 comprises a hollow outer body 31 and more than one inner body 32 positioned inside the outer body 31. In the exemplary embodiments of FIGS. 4 and 5, the first electrode 30 comprises two inner bodies 32; and in the exemplary embodiments of FIGS. 6 and 7, the first electrode 30 comprises three inner bodies 32. In both embodiments, the inner bodies 32 are not coaxial with the outer body 31 of the first electrode 30, i.e., in these embodiments the inner bodies 32 are positioned at an angle relative to a longitudinal axis 99 of the outer body 31 (and the cell 10). In the embodiments of FIGS. 4 and 5, the inner bodies 32 are substantially perpendicular to the common longitudinal axis 99 of the cell 10 and of the outer body 32. In the embodiment of FIGS. 6 and 7, the inner bodies 32 are positioned at an acute angle relative to a longitudinal axis 99 of the cell 10. In the above embodiments, the outer body 31 and the inner bodies 32 of the first electrode 30 are joined together inside the housing 20 to form a single substantially homogeneous structure of the first electrode 30 having an essentially uniform electrode properties, such, e.g., as electric conductivity throughout.

In the above exemplary embodiments of FIGS. 4-5 and 6-7, the intermediate body 41 of the second electrode 40 has at least one void, or empty space, therein. This at least one void or empty space is at least partially occupied by the inner body 32. In the embodiment of FIGS. 4 and 5, the intermediate body 41 has two empty spaces therein, each at least partially occupied by the inner body 32; and in the embodiment of FIGS. 6 and 7, the intermediate body 41 of the second electrode 40 has three empty spaces therein, each at least partially occupied by the inner body 32. In other words, each of the inner body 32 of the first electrode 30 is at least partially disposed in the corresponding empty space, or void, formed in the intermediate body 41 of the second electrode 40.

The present invention contemplates embodiments in which at least a portion of one of the outer body 31, the inner body 32, and the intermediate body 41 has a shape selected from the group consisting of cylinder, prism (not shown), polyhedron (not shown), torus (not shown), pyramid (not shown), cone (including frustum of a cone or cone-like shapes), sphere (including semi-spherical or partially-spherical shapes) (not shown), and any combination thereof.

Figure 8:
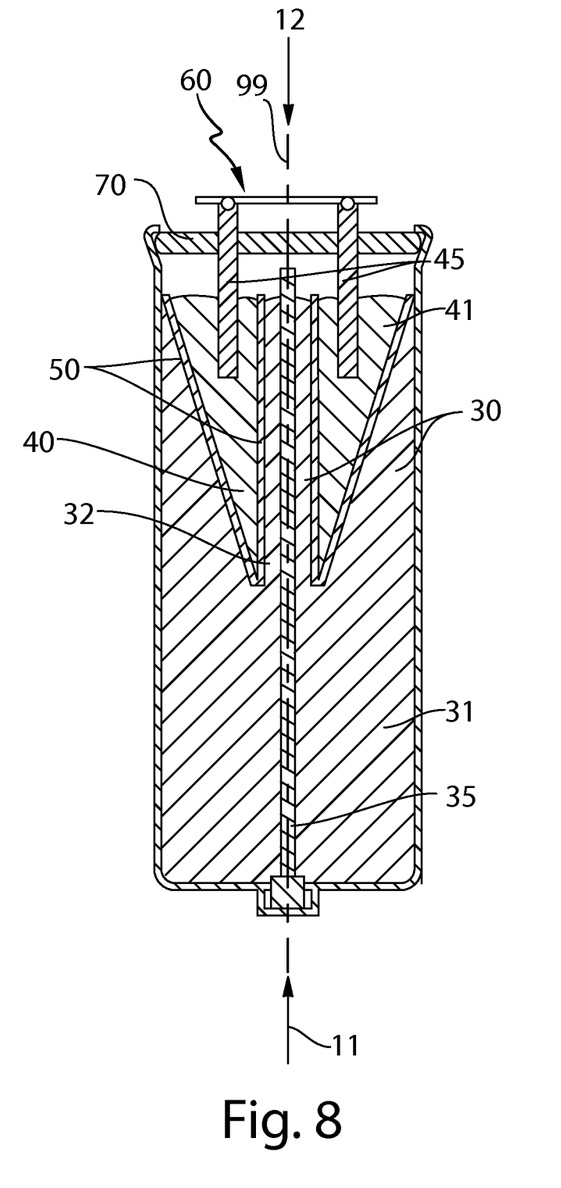
FIG. 8 is a schematic cross-sectional view of another embodiment of the cell of the invention, in which the second electrode has a shape generally comprising a cone.
Figure 9:
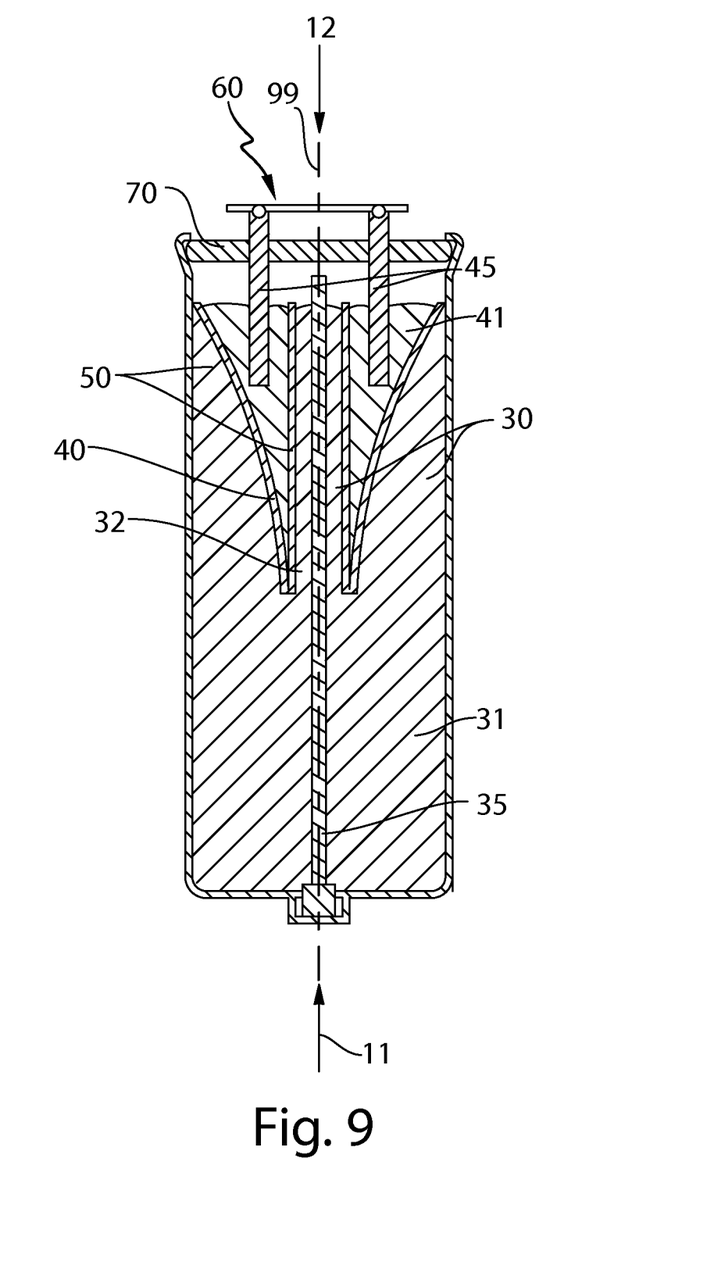
FIG. 9 is a schematic cross-sectional view of an embodiment of the cell, in which the second electrode has a shape generally comprising a cone having concave outer sides.

In the exemplary embodiment of FIG. 8, e.g., the inner body 41 of the second electrode 40 comprises a cone. FIG. 9 shows another exemplary embodiment of cell 10 in which the inner body 41 of the second electrode 40 has a cone-like shape comprising a "cone" having a curved, concave side surface. An alternative embodiment (not shown) of the cell 10, in which the second electrode 40 has a cone-like shape comprising a "cone" having a convex side surface is also contemplated.

All of the above embodiments of the cell 10 offer an increased interfacial area; therefore, a higher rate capability is expected in all of the above embodiments. All of the above embodiments are within the scope of the present invention.

Any known anode can be used in the cell 10 of the invention. The anode can be formed of an anode active material, a gelling agent, and minor amounts of additives, such as gassing inhibitor. Examples of the anode active material include zinc. The anode material may comprise conventional zinc slurry or solid zinc, such as, e.g., one formed of particulate zinc and possessing a high specific-surface area, similar to that of a conventional zinc slurry. The anode can be electrically isolated from the cathode by an electronically insulating but ionically conductive separator. Preferably, to compensate for the increased active material in the cathode, the anode active material includes zinc having a fine particle size, e.g., an average particle size of less than about 175 microns. The use of this type of zinc in alkaline cells is described, e.g., in U.S. Pat. No. 6,521,378, the disclosure of which is incorporated herein by reference. The zinc loading also tends to affect the degree of cell distortion, with higher loadings tending to cause increased swelling of the anode. The zinc loading in the zinc slurry used to manufacture the anode can be from about 64% to about 69% and more specifically from about 66% to about 68%. Examples of a gelling agent can include a polyacrylic acid, a grafted starch material, a salt of a polyacrylic acid, a carboxymethylcellulose, a salt of a carboxymethylcellulose (e.g., sodium carboxymethylcellulose) or combinations thereof. The gassing inhibitor may include an inorganic material, such as, e.g., bismuth, tin, or indium. Alternatively, the gassing inhibitor can include an organic compound, such as, e.g., a phosphate ester, an ionic surfactant, or a nonionic surfactant.

Anode metal grids and foils which act as a current collector and support for the zinc active material may include any low-gassing metal or alloy, such as, e.g., brass, bronze, silicon bronze, phosphor bronze, copper or silver and may be coated or plated with, e.g., tin, indium, silver, copper, lead, or cadmium to further reduce gassing.

Any known cathode material can be used in the cell 10 of the invention. The cathode material may be "hard" ($MnO_2$, graphite, KOH, $H_2O$, optional binder and minor additives) or "soft" ($MnO_2$, carbon black, graphitized carbon black, KOH, $H_2O$, optional graphite, binder and minor additives). $MnO_2$ may be EMD (Electrolytic Manganese Dioxide) or CMD (Chemical manganese Dioxide) or a blend. Graphite may be natural, synthetic, expanded or non-expanded. Carbon black may be a conventional carbon black (acetylene black, lampblack, channel black) or a graphitized carbon black. Carbon fibers, carbon nanotubes, carbon nanofibers or other conductivity aids (metal flake, fiber, powder) may be employed along with graphites and carbons or in place of these.

Cathode metal grids and foils which act as a current collector and support for the cathode blend may consist of iron, steel, nickel plated steel (NPS), nickel, nickel alloy and may be plated with nickel, cobalt, gold or alloys of these metals and may also be coated with carbon-loaded conductive paints.

The cathode material may be provided in the form of pressed pellets. For optimal processing, it is generally preferred that the cathode have a moisture level in the range of from about 2.5% to about 5% and more specifically from about 2.8% to about 4.6%. It is also generally beneficial to have the cathode having a porosity of from about 22% to about 30%, for a good balance of manufacturability, energy density, and integrity of the cathode.

Examples of binders that can be used in the cathode include polyethylene, polyacrylic acid, or a fluorocarbon resin, such as PVDF or PTFE. One example is a polyethylene binder sold under the trade name COATHYLENE HA-1681, available from Hoechst or DuPont. Examples of other additives are described in, for example, U.S. Pat. No. 5,698,315, U.S. Pat. No. 5,919,598; and U.S. Pat. No. 5,997,775, and U.S. application Ser. No. 10/765,569.

We believe that the battery of the invention, having increased interfacial area as described herein, provides an improved performance over a comparable battery of a conventional bobbin-type design having equivalent parameters. A simulated discharge performance testing can be based upon a first-principles mathematical model that models key phenomena, such as mass transport, anode and cathode reaction kinetics, etc., that occur within a battery under a specific discharge condition, in order to predict battery performance. The discharge protocol of the simulated discharge performance test consists of simulating the application of a constant-current discharge of 250 mA to a specific battery design until the battery reaches a 0.9 V cutoff voltage. The total number of hours, or runtime, for the simulated battery to reach the cutoff voltage is reported.

Parameters for an AA battery, as schematically represented in FIG. 1, having electrodes of increased interfacial area, are selected for entry into the simulated-discharge-performance-testing model. The simulated battery has an anode, includes 4.34 g of zinc (Zn), in an aqueous electrolyte. The simulated battery includes 3.82 g of an aqueous electrolyte including 33 weight percent potassium hydroxide (KOH) and 2 weight percent zinc oxide (ZnO) in water. The simulated battery has a cathode, including electrolytic manganese dioxide (EMD) in the amount of 10.1 g and 0.46 g of graphite. The cathode has a porosity of 26%. The simulated battery also includes a separator that is inert and porous. The simulated battery also includes current collectors that are inert and electronically conductive.

The simulated discharge performance testing is a simulated run with the aforementioned battery parameters. The battery of increased interfacial area of the design represented in FIG. 1 may result in a simulated discharge performance of 10.7 hours. This is an improvement of about 11% when compared to the simulated performance of an AA battery of a conventional bobbin design having equivalent parameters of the increased interfacial area battery, such as amount of active material, electrode formulations, and separator, along with a current-collector nail centrally located within the anode compartment of the bobbin cell.

Any dimensions and values disclosed herein are not to be understood as being strictly limited to the exact numerical values recited. Instead, unless otherwise specified, each such dimension or value is intended to mean both the recited dimension/value and a functionally equivalent range surrounding that dimension/value. For example, the dimensions disclosed herein as "0.30 mm," "0.20 mm," and "0.10 mm" are intended to mean, respectively, "about 0.30 mm," "about 0.20 mm," and "about 0.10 mm."

While particular embodiments of the present invention have been illustrated and described, it would be obvious to those skilled in the art that various other changes and modifications can be made without departing from the spirit and scope of the invention. The appended claims, therefore, are intended to cover all such changes and modifications that are within the scope of this invention.

What is claimed is:

1. An alkaline cell comprising a housing having a bottom end and a top end, and an electrode assembly disposed within the housing, the electrode assembly comprising a single first electrode and a single second electrode, a separator disposed between the first electrode and the second electrode, and an electrolyte, wherein the first electrode comprises a hollow outer body and at least one inner body positioned inside the outer body, the outer body and the at least one inner body being joined together inside the housing to form a single substantially homogeneous structure having an essentially uniform electrode properties; and the second electrode comprises an intermediate body at least partially disposed between the outer body and the at least one inner body and electrically isolated from the outer body and the at least one inner body;

wherein the first electrode comprises at least a first end disk disposed adjacent to the bottom end of the cell and integrally interconnecting the outer hollow body and the at least one inner body to form the single substantially homogeneous structure.

2. The cell of claim 1, wherein the at least one inner body is positioned coaxially with the outer body.

3. The cell of claim 1, wherein the at least one inner body is positioned at an angle relative to a longitudinal axis of the outer body.

4. The cell of claim 1, wherein the intermediate body has at least one empty space therein, said at least one empty space being at least partially occupied by the at least one inner body.

5. The cell of claim 1, wherein the intermediate body is coaxial with at least one of the outer body and the at least one inner body.

6. The cell of claim 1, wherein at least one of the outer body, the at least one inner body, and the intermediate body has a shape selected from the group consisting of cylinder, prism, polyhedron, torus, pyramid, cone, sphere, and any combination thereof.

7. The cell of claim 1, wherein each of the housing, the outer body, the at least one inner body, and the intermediate body has a shape comprising a cylinder and wherein the housing, the outer body, the at least one inner body, and the intermediate body have a common longitudinal axis.

8. The cell of claim 1, wherein the first electrode further comprises a second end disk disposed adjacent to the top end of the cell and integrally interconnecting the outer hollow body and the at least one inner body to form the single substantially homogeneous structure.

9. The cell of claim 1, wherein the cell includes at least one first current collector disposed inside the at least one inner body and electrically connecting the first electrode to one of the top end and the bottom end of the housing.

10. The cell of claim 9, wherein at least one of the first current collector and the second current collector comprises material selected from the group consisting of steel, bronze, and any combination thereof.

11. The cell of claim 9, wherein at least one of the first current collector, the second current collector, and the housing is plated with a material having low electrical-contact resistance to the first electrode.

12. The cell of claim 11, wherein the material having low electrical-contact resistance is selected from the group consisting of nickel, cobalt, carbon-loaded paint, and any combination thereof.

13. The cell of claim 1, wherein the cell includes at least one second current collector electrically connecting the second electrode to the housing or to one of the bottom end and the top end of the housing.

14. The cell of claim 1, wherein the first electrode is a positive electrode (cathode) and the second electrode is a negative electrode (anode).

15. The cell of claim 1, wherein the first electrode is a negative electrode (anode) and the second electrode is a positive electrode (cathode).

16. The cell of claim 1, wherein the housing is at least partially made of a metal lined with a plastic to isolate inner surface of the housing from the first electrode.

17. The cell of claim 1, wherein the housing is at least partially made of a metalized plastic.

\* \* \* \* \*